(No Model.)
E. THOMSON.
Commutators for Dynamo Electric Machines.
No. 242,488. Patented June 7, 1881.
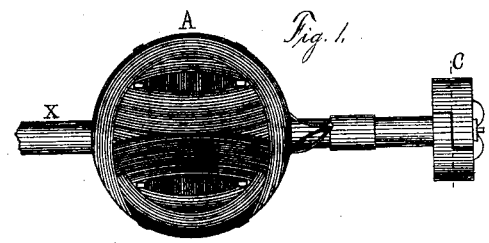
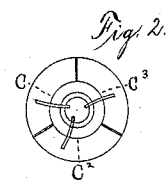
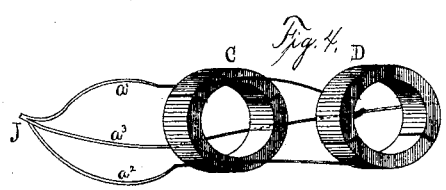
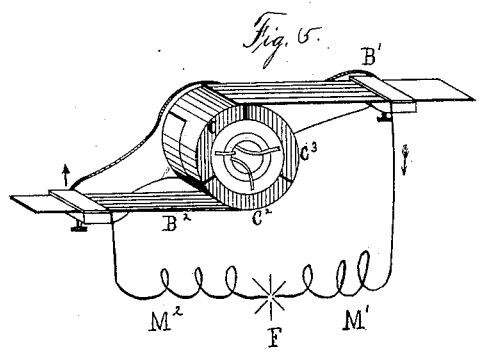
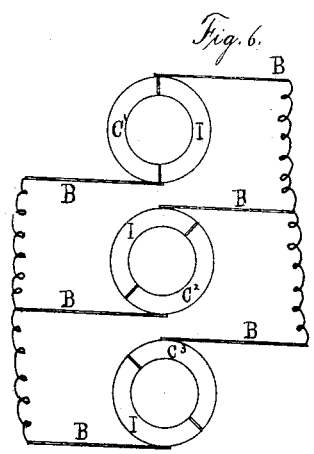
Witnesses
W. B. Thomson.
E. W. Rice.
Inventor,
Elihu Thomson.

UNITED STATES PATENT OFFICE.

ELIHU THOMSON, OF NEW BRITAIN, CONNECTICUT.

COMMUTATOR FOR DYNAMO-ELECTRIC MACHINES.

SPECIFICATION forming part of Letters Patent No. 242,488, dated June 7, 1881.

Application filed January 10, 1881. (No model.)

*To all whom it may concern:*

Be it known that I, ELIHU THOMSON, a citizen of the United States, residing in New Britain, county of Hartford, State of Connecticut, have invented a new and useful Improvement in Commutators for Dynamo-Electric Machines, of which the following is a specification.

My invention relates to a novel method of obtaining direct currents from armature-coils in which reversed currents are generated to be applied to all purposes for which direct currents are employed, but particularly in electric lighting.

The objects I have attained in the practice of my improvement are a practically sparkless commutator, and one which admits the variation of the current-producing power of the machine, either automatically or not, so as to adapt the electro-motive force to the resistance of the circuit.

In my invention a system of armature coils and terminals—preferably three coils forming a three-branched conductor—has its three terminals connected to three segments in the commutator, each segment covering an angle of one hundred and eighty degrees, or thereabout, and to which segments two strips or brushes are applied in diametrically-opposite positions to convey off the current.

In my invention there is no instant in which any of the armature-coil terminals are out of connection with both the commutator-brushes; but before breaking contact with one of the brushes the terminal always makes contact with the opposite brush.

It might at first seem that in operating my invention short-circuiting of the armature-coils would result, but in practice I find no evidences of such result.

Figure 1 is an elevation of a spherical armature, A, provided with my present invention or commutator, C. Fig. 2 is an end view of the commutator, with its three segmental blocks, C' C² C³. Fig. 3 shows the form of one of the segments, C'. Fig. 4 is a view intended to elucidate the connections and arrangement of parts. Fig. 5 shows the application of commutator-brushes B' B² to the commutator, and their relations to the circuit of the field-magnet coils. Fig. 6 shows an equivalent arrangement of commutator segments and brushes to that shown in Fig. 2.

My invention may be applied to various forms of armatures wound with a system of armature-coils; but I have found it best suited to the case of a set of armature-coils constituting a conductor of three branches, or system composed of three armature-coils with one terminal from each coil connected in a common joint, while the three free terminals are carried to the commutator. The coils are situated relatively one hundred and twenty degrees apart upon the armature—that is, successively reach their maximum electrical activity by a revolution of one hundred and twenty degrees of the armature. This system of winding forms the subject of former inventions.

The three terminals from the armature-coils are connected to three segmental blocks on the commutator C' C² C³, each block extending around the commutator one hundred and eighty degrees, the centers of the blocks being one hundred and twenty degrees apart. The form given to each block is shown in Fig. 3, C', and the three blocks so formed constitute the commutator-cylinder. Each block may be considered as composed of two segments of a ring of one hundred and twenty degrees each, and joined laterally, the junction covering only sixty degrees, as shown by dotted lines, Fig. 3. In fact, if necessary, two complete rings, C D, Fig. 4, may be used instead of C, Fig. 1, each ring divided into three parts of one hundred and twenty degrees each, but the segments of the ring D placed sixty degrees in advance of those of C, and to which they are respectively connected, as shown. In all cases it is, of course, necessary to insulate the segments of each ring from one another. In Fig. 4 $a'$ $a^2$ $a^3$ represent single lines of armature-wire which are merged in the common joint J.

Commutator-brushes are applied in diametrically-opposite positions, B' B², Fig. 5, as usual in the art. The arrangement shown in Fig. 4 requires four brushes, the two upper and two lower connected as one, and is but the equivalent of Fig. 5. The circuit is completed from the brush B', Fig. 5, to the brush B² through one of the field-magnet coils, as M'; thence through a number of electric lamps or other resistances, as F; thence through another field-magnet coil, M², to the brush B².

Fig. 6 shows another equivalent arrangement of commutator-segments. In this case there are three commutator-rings divided into halves, the halves being insulated from each other. To the segment C' of the first ring is attached one terminal from the armature-coil system, to C² of the next ring the second armature-terminal, and to C³ of the last ring the last or third terminal. The pieces I I I are of metal or insulator, and are unconnected, serving merely to fill out the circle of each ring. The three rings are mounted, in positions different with respect to one another one hundred and twenty degrees, as shown, upon a shaft, and revolve together, though shown separate in the figure. Three pairs of commutator-brushes, B B, B B, B B, are applied, and the corresponding ones on each side connected together. The operation is in all respects similar to that of the arrangement shown in Fig. 5.

Since each commutator-segment covers an angle of one hundred and eighty degrees, and the brushes B' B² are set diametrically opposite, each segment will at all times touch at least one of the commutator-brushes, and occasionally will occupy such a position as to connect both metallically. At such a time the two other segments will be discharging powerful currents into the two brushes, due to said segments being in contact with each brush respectively, and connected to armature-wire active in generating current. This would seem to involve the production of a short circuit through the segment in contact with both brushes, but in practice I find no evidence of short-circuiting. The explanation is, doubtless, that the inertia of the current in the whole circuit preserves, during the period when a short circuit would be possible, the flow of current outward from the armature unchanged in force and direction. This effect is enhanced the larger the machine and the longer the circuit over which it operates. My invention may therefore be designated as one which operates without the cutting out of armature-wire at the neutral point to avoid short-circuiting.

A valuable feature of my invention is the capability of changing the electro-motive force by a simple movement of the commutator-brushes, and thereby operating a greater or less number of lights in a circuit, at the same time that no sparks or injurious action takes place at the commutator.

A movement backward of the brushes, or in the reverse direction to that of the rotating commutator, lowers the electro-motive force, assuming that we start from the maximum position. The arrows, Fig. 5, indicate this movement. In a former invention, in which a three-segment commutator is described, the same effect of lowering the electro-motive force was effected by a movement of the brushes in a direction the same as that of the revolving commutator.

I claim as my invention—

1. In a dynamo-electric machine, a commutator containing three or more segmental blocks, substantially as described, each block covering an angle equal to the angular distance of the commutator-brushes apart, whereby the armature-wire terminals are put into connection with both commutator-brushes when at or near the neutral point.

2. In a dynamo-electric machine, a three-branched armature-coil system, the free terminals of which are connected singly to three segments of a commutator-ring, each segment covering an angle of one hundred and eighty degrees, substantially as described, and provided with a pair of commutator-brushes resting on diametrically-opposite portions of said commutator-ring.

3. In a dynamo-electric machine, a system of armature-coil terminals connected successively to segments of the commutator, and adapted to be put successively into connection with both commutator-brushes when at or near the point of neutral polarity, substantially as described.

ELIHU THOMSON.

Witnesses:
FRED C. WILSON,
G. W. HART.